Jan. 5, 1965  R. WICK ETAL  3,164,056
PHOTOGRAPHIC COPYING MACHINE
Filed March 22, 1960  4 Sheets-Sheet 1
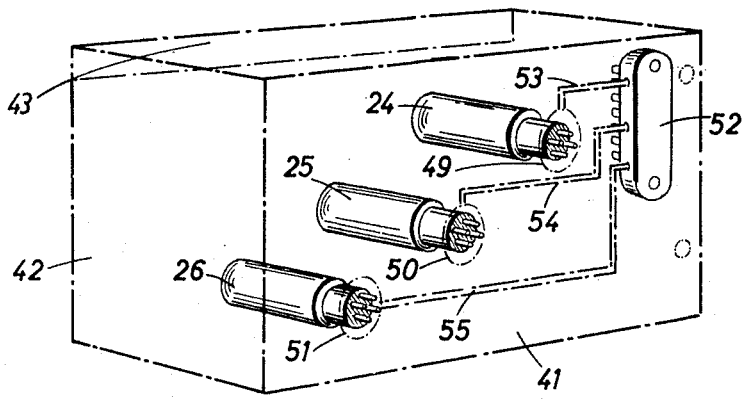
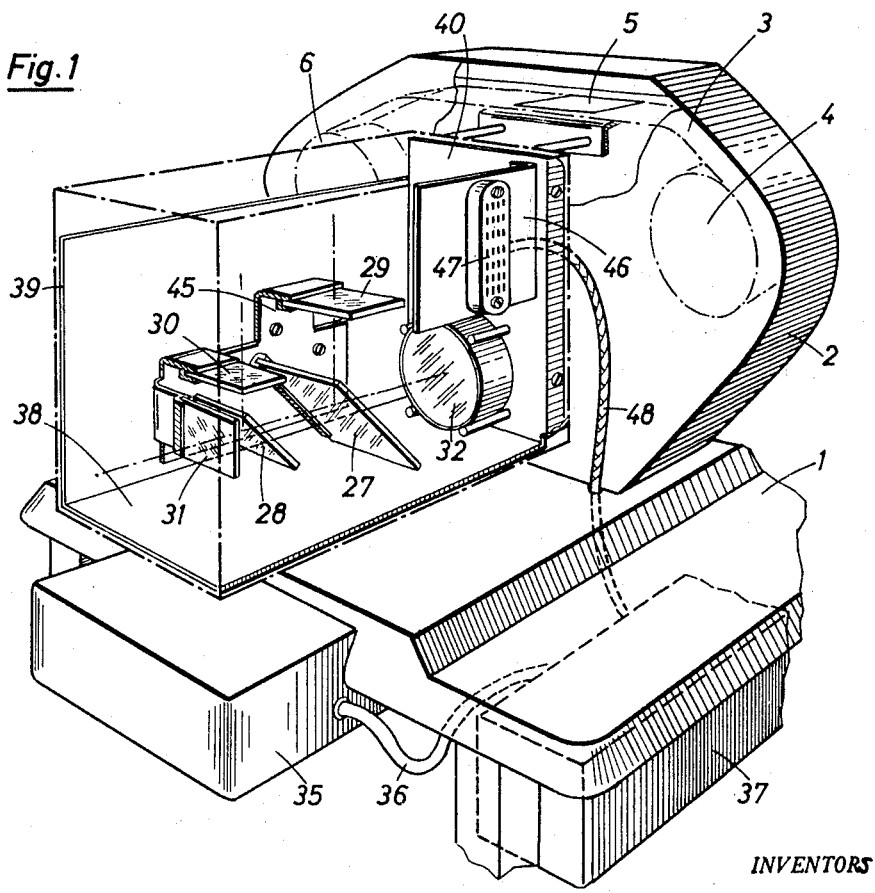
INVENTORS
RICHARD WICK
HANS ADO BRANDT
BY
Michael S. Striker
Attorney Jan. 5, 1965    R. WICK ETAL    3,164,056
PHOTOGRAPHIC COPYING MACHINE
Filed March 22, 1960    4 Sheets-Sheet 2

INVENTOR.
RICHARD WICK
HANS ADO BRANDT
BY

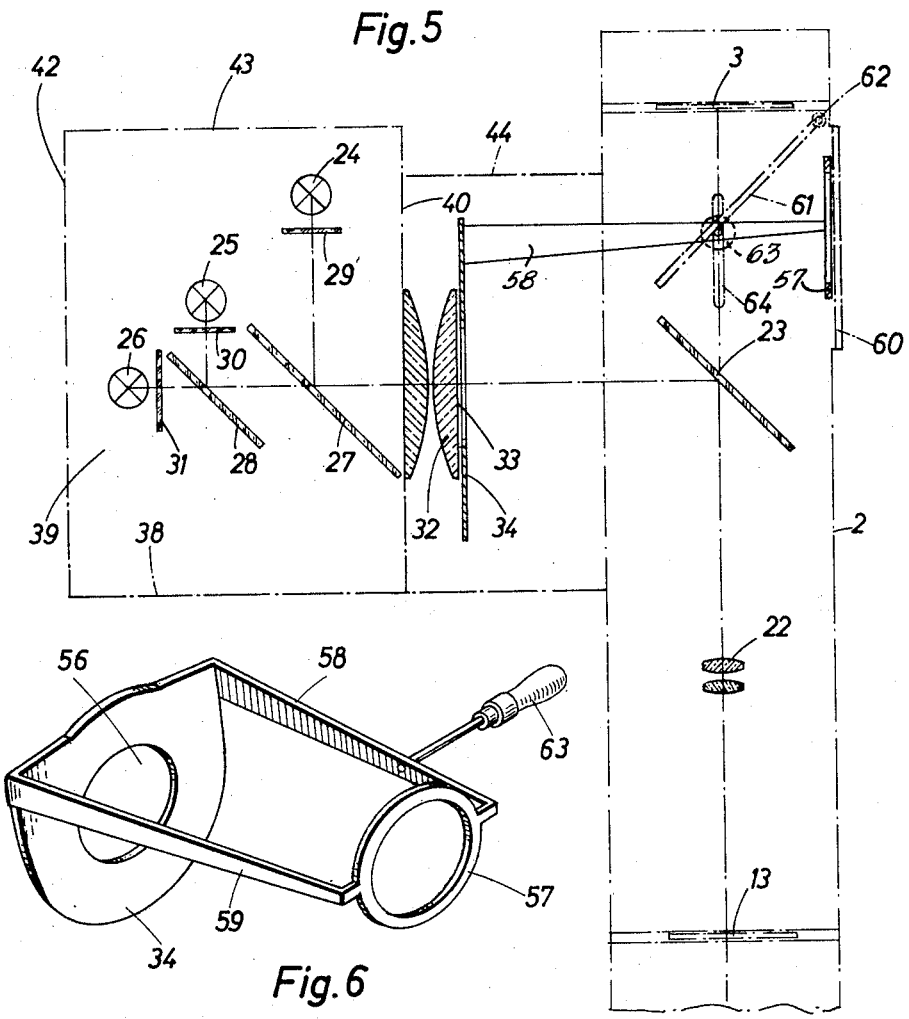

Jan. 5, 1965  R. WICK ETAL  3,164,056
PHOTOGRAPHIC COPYING MACHINE
Filed March 22, 1960  4 Sheets-Sheet 4

INVENTOR.
RICHARD WICK
HANS ADO BRANDT
BY
Michael S. Striker
Attorney

3,164,056
PHOTOGRAPHIC COPYING MACHINE
Richard Wick, Am Dullanger 3, Grunwald, near Munich, Germany, and Hans-Ado Brandt, Scharfreiterplatz 40, Munich, Germany
Filed Mar. 22, 1960, Ser. No. 16,756
Claims priority, application Germany, Mar. 26, 1959, A 31,690
7 Claims. (Cl. 88—24)

The present invention relates to photographic printers and more particularly to photographic printers used for making color prints.

In photographic color printers it is conventional to arrange in the path of light from the objective to the light-sensitive paper a semi-transparent reflector which will direct part of the light passing from the objective toward the paper to a photoelectric assembly which is used for measuring and regulating the exposure. In the conventional structures of this type the photocells are arranged so as to receive directly or on light-diffusing plates located immediately in advance of the photocells images of the negative which is to be printed. This arrangement results, however, in inaccurate light measurement since negatives which do not have a uniform density will not with such an arrangement provide at the photocells light which corresponds to the average density of the negative.

Thus, one of the objects of the present invention is to overcome the above drawbacks by providing a photographic color printer which will reliably cause the light measuring means to measure light which corresponds to the average density of the negative which is to be reproduced.

It is to be understood that the term "negative" as used herein does not only refer to a black and white negative but rather refers also to a so-called color negative or to a color transparency.

Another object of the present invention is to provide a photographic color printer with a structural arrangement which will guarantee that components of the photographic printer such as the components of the light-measuring assembly are easily accessible so as to be capable of being adjusted, exchanged, cleaned, and the like, easily and quickly.

It is also an object of the invention to provide in a photographic color printer separate units which can be quickly and easily assembled so as to provide the complete printer.

It is furthermore an object of the present invention to provide a photographic color printer of the above type with a structure which will enable the operator to make a selection of a particularly important part of the negative which may be used to control the manner in which the color reproduction is made.

With the above objects in view the invention includes in the photographic color printer a light source as well as a first support means for supporting a negative through which light passes from the light source. An objective means is arranged in the path of light which has passed through the negative, and on the side of the objective means opposite from the negative is located a second support means for supporting the light-sensitive copy paper on which the color reproduction is to be made. A light-measuring means is provided for measuring the light which passes from the objective means to the reproduction paper, and in accordance with the present invention there is arranged between the objective means and the light-measuring means an optical means which will direct to the light-measuring means the exit pupil image of the objective means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a partly diagrammatic fragmentary illustration of a photographic color printer according to the invention as seen from the rear;

FIG. 2 is a partly diagrammatic perspective illlustration of a component of a light-measuring assembly which is part of the photographic printer of the invention, the structure which is shown in FIG. 2 being omitted from FIG. 1 and being adapted to be assembled with the structure shown in FIG. 1;

FIG. 5 is a diagrammatic vertical sectional illustration of the light-measuring structure of the invention and the optical elements of the printer which cooperate with the light-measuring assembly;

FIG. 6 is a diagrammatic perspective illustration of parts of FIG. 5; and

Figure 3:
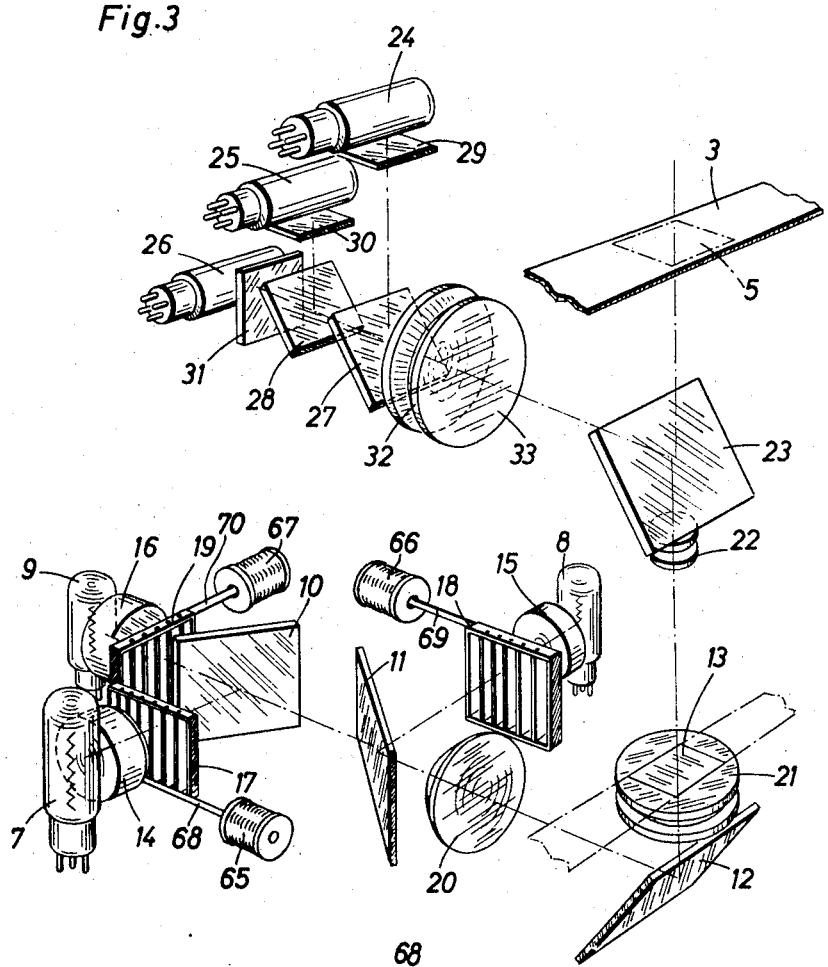
FIG. 3 is a diagrammatic perspective illustration of the optical structure of the photographic printer of the invention.

Referring to FIG. 1, it will be seen that the structure illustrated therein includes a base 1 which forms part of a workbench and which carries the housing 2 of a photographic printer which prints photographic reproductions on light-sensitive paper, this paper being derived from a supply roll 4 diagrammatically indicated in FIG. 1 so as to provide the light-sensitive strip 3 of paper on which the reproductions are made one after the other along the strip 3, the exposed strip being wound into a take-up roll 6 in a purely conventional manner. The strip of paper 3 is moved in a well-known manner past an exposure window 5 where the successive portions of the strip 3 of light-sensitive copy paper are exposed one after the other, the strip 3 being advanced in a stepwise fashion through a well-known structure which forms no part of the present invention.

The exposure of the light-sensitive paper takes the form of application to the paper simultaneously of three additive basic colors, these colors being blue, green and red, and each of these three basic colors is automatically controlled by a photoelectric exposure control device so that in this way the extent to which the paper is exposed to the three basic colors is automatically regulated. The optical structure for exposing the copy paper in a controlled manner is shown most clearly in FIGS. 3 and 5.

Referring now to FIG. 3 it will be seen that the structure includes a light source means made up of three light sources 7, 8 and 9, and an interference filter means 10, 11 is provided for regulating the basic colors which are derived from these three light sources. Thus, it will be seen that the interference filter 10 is arranged to receive light from the light sources 7 and 9. This interference filter 10 has the property of reflecting blue and allowing red and green to pass through the filter 10. Thus, the blue portion of the light from the light source 7 will be reflected by the filter 10 toward the filter 11 while the red and green portions of the light from the light source 7 will simply pass through the filter 10. On the other hand, the red and green portions of the light from the light source 9 will pass through the filter 10 to the filter 11, while the blue portion of the light from the light source 9 will be reflected by the filter 10. Thus, the filter 11 will receive red and green light portions from the light source 9 and a blue light portion from the light source 7. The interference filter 11 has the property of reflecting the red portion of light while allowing the blue and green portions thereof to pass therethrough. As a result the red portion of the light from the light source 9 which reaches the interference filter 11 will be reflected by the latter, and thus only the green portion of the light received from the light source 9 will pass through the filter 11, and also the blue portion of the light from the light source 7 will be reflected by the filter 10 to the filter 11 and will pass through the latter filter. The filter 11 cooperates with the light source 8 to reflect only the red portion of the light from the light source 8 through the condenser 20 toward the reflector 12. The blue and green portions of the light derived from the light source 8 will pass through the filter 11. However, the blue and green light portions derived from the light sources 7 and 9 will also pass through the filter 11 and then through the condenser lens 20 to the reflector 12. In this way the reflector 12 receives the three basic colors from the three light sources 7-9, and it is evident that blue is received from the light source 7, red is received from the light source 8, and green is received from the light source 9.

Located over the reflector 12 is a support means for the negative 13 which is to be reproduced, and the light is directed by the reflector 12 through the negative 13. If desired, or if required, blue, red, and green filters may respectively be arranged in front of the light sources 7-9. Condenser lenses 14-16 are respectively arranged in front of the light sources 7-9, and also jalousie shutters 17-19 are respectively arranged in front of the light sources 7-9 with the condenser lenses 14-16 respectively located between the shutters 17-19 and the light sources 7-9, respectively. A second condenser lens 21 is arranged in advance of the negative 13 so that the common path of the three basic colors derived from the light sources 7-9 passes through the condenser lenses 20 and 21, and if desired a light-diffusing plate may also be arranged in the common path of light of the three basic colors.

An objective means 22 is arranged between the negative 13 and the light-sensitive paper 3 which is supported on a suitable support means so as to be exposed at the window 5, and this objective means 22 is a conventional objective used for projecting the light which issues through the negative 13 on to the printing paper, and of course the objective will produce on the printing paper a sharp image of the negative 13.

A semi-transparent reflector 23 extends across the optical axis of the objective means 22 between the latter and the printing paper 3, and the semi-transparent reflector 23 makes an angle of 45 degrees with the optical axis. Thus, part of the light which has passed through the objective means 22 will be reflected to the left, as viewed in FIGS. 3 and 5, to an optical means 32 in the form of a field lens which has directed toward the objective means 22 a surface 33 located in the image plane of the objective 22 with respect to the distance of the negative 13 therefrom, so that a sharp image of the negative 13 will also be produced on the surface 33 of the field lens 32. The element 23 serves to reflect part of the light to the exposure control assembly which is in the form of a photocell means which includes the three photocells 24-26. A pair of interference filters 27 and 28 are arranged in advance of the photocells 24-26 in order to divide the light reflected by the element 23 into its basic colors, and these basic colors are respectively received by the photocells 24-26. Thus, the interference filter 27 reflects the blue portion of the light to the photocell 24 and allows the red and green portions of the light to pass through the filter 27 to the interference filter 28. This interference filter 28 reflects the red portion of the light to the photocell 25 and allows the green portion of the light to pass through the filter 28 to the photocell 26. Thus, the photocells 24, 25 and 26 will respectively receive only blue, red, and green light. In the event that the selective properties of the interference filters 27 and 28 are inadequate where there is a relatively large divergence in the light which is to be measured, a blue filter can be arranged in front of the cell 24, a red filter can be arranged in front of the cell 25, and a green filter can be arranged in front of the cell 26. Light-diffusing plates 29-31 are respectively arranged in front of the photocell 24-26, and the three light-diffusing plates 29-31 are equidistantly located from the semi-transparent reflector 23 with respect to the light path.

As was mentioned above, the surface 33 of the field lens 32 receives a sharp image of the negative 13. This field lens 32 has a refractive power which will project an image of the exit pupil of the objective means 22 onto the light-diffusing plates 29-31 of the three photocell means. In this way, there is provided in accordance with the present invention, a guarantee that the light-diffusing plates 29-31 will have the light uniformly distributed over their areas even if the negative 13 has a considerable variation in its density, so that the light intensity of the several light-diffusing plates 29-31 will correspond to the average color density of the basic colors of the negative 13.

An adjustable masking plate 34 of conventional construction is arranged in the image plane of the objective 22 next to the surface 33 of the field lens 32, and this masking plate 34 having a central opening 56 is connected to an indicating ring 57 by means of rods 58, 59, see FIG. 6. The central opening 56 of the masking plate 34 and the ring 57 have equal diameters. The ring 57 is arranged in another focal plane of the objective 22 next to the ground glass plate 60 used as a viewing screen. Said ground glass plate 60 is arranged in a wall of the housing 2 and is illuminated by the mirror 61 which is turnably mounted upon the axis 62. The mirror 61 is movable between an operative position, shown in FIG. 5, for illuminating the viewing screen in order to produce an image of the transparency 13 on said screen, and between an inoperative position in which said mirror 61 is turned down next to said viewing screen for allowing the light-sensitive material 3 to be exposed to the printing light.

Said masking plate 34 and said indicating ring 57 can be adjusted in several directions parallel to the surface 33 of said field lens 32 and to said viewing screen 60 so as to limit the photoelectric measurement to the light which passes through only a selected important portion of the negative indicated by said ring 57 on said viewing screen 60, such as a portion thereof which dominates or which is considered representative of the colors. A handle 63 connected to the rod 58 and traversing a slot 64 of the housing 2 is provided for moving the masking plate 34 and the indicating ring 57 horizontally and vertically. The sliding mounts of the plate 34 and the cover plate arranged upon the connecting rod between the rod 58 and the handle 63 for covering the slot 64 are known per se and not shown in the drawings.

Figure 4:
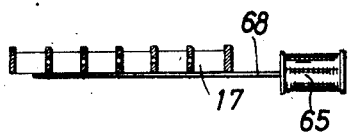
FIG. 4 is a transverse sectional view of a particular type of shutter element which forms part of the optical assembly of FIG. 3.
Figure 7:
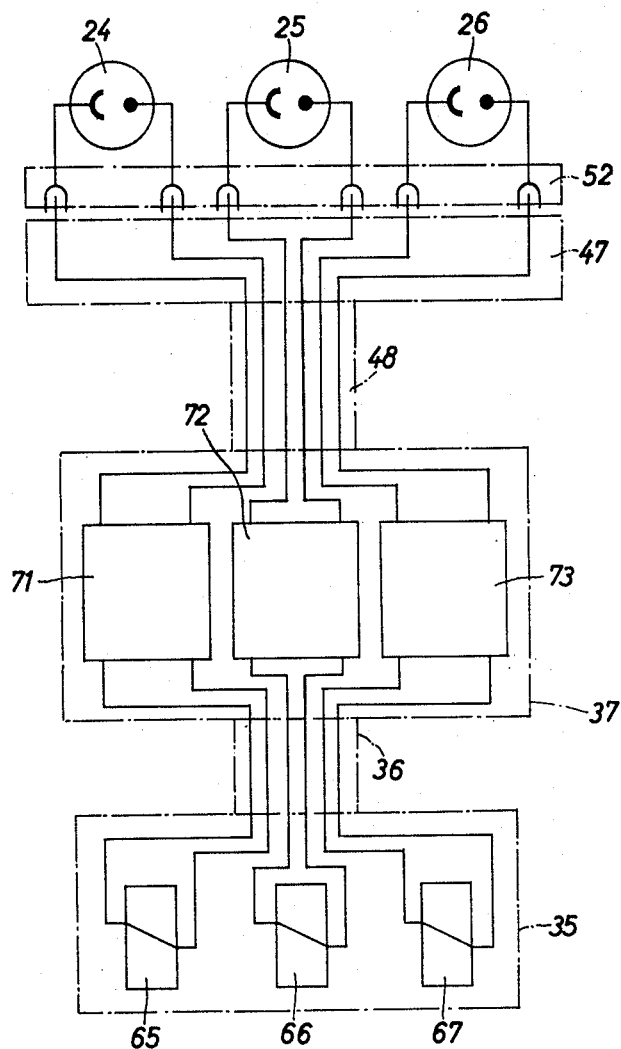
FIG. 7 is a diagrammatic illustration of the electrical portions of the structure shown in FIGS. 1–3.

The several light sources 7-9 are constantly energized during operation of the printer. The several jalousie shutters 17-19 controlled by electromagnets 65, 66, 67 and their armatures 68, 69, 70 are simultaneously opened by having their turnable plates simultaneously turned from a closed toward an open position in a well-known manner, and the construction of the shutter 17 is shown in detail in FIG. 4. Thus, when these several shutters 17-19 are moved from a closed to an open position the exposure of the paper 3 will begin. As soon as the photocell 24 receives a predetermined amount of blue light the photocell 24 will cause an electronic regulating device 71 to act through the solenoid 65 on the shutter 17 so as to close the latter and thus terminate the exposure of the paper 3 to blue light. In the same way the photocell 25 when it receives a predetermined amount of red light will cause an electronic regulating device 72 to act through the solenoid 66 on the shutter 18 so as to close the latter and thus terminate the exposure of the paper 3 to red light, and also in the same way the photocell 26 will, after receiving a predetermined amount of green light, cause an electronic control assembly 73 to act through the solenoid 67 on the shutter 19 to close the latter and thus terminate the exposure of the paper 3 to green light, and in this way the photoelectric light-measuring means of the invention operates automatically to control the extent to which the printing paper is exposed to the three basic colors. Each of the electronic regulating devices 71, 72, 73 is of known construction and preferably of the type shown in FIG. 3 of U.S. Patent 2,835,849. Therefore, the regulating devices 71, 72, 73 are shown in FIG. 7 only schematically.

In accordance with the present invention the entire light source assembly forms a single unit located in a housing 35 (FIG. 1). Within this single housing 35 are located the lamps 7–9 together with the interference filters 10 and 11, the jalousie shutters 17–19, together with the solenoids 65, 66, 67, and the condenser lenses 14–16 and 20, and the housing 35 is slidable along the underside of the table 1 to the position indicated in FIG. 1, the housing 35 being supported in the position illustrated in FIG. 1 in any suitable way. A cable 36 connects the solenoids 65, 66, 67 within the housing 35 electrically with the electronic regulating devices 71, 72, 73 which are housed within a housing 37 also carried by the table 1 in the position indicated in FIG. 1, and it is these electronic regulating devices which cooperate with the photocells 24–26 in the manner described above for automatically closing the several shutters 17–19 when predetermined amounts of the basic colors have been received by the printing paper 3.

The entire light-measuring means which includes the photocells 24–26, the interference filters 27 and 28, as well as the light-diffusing plates 29–31 is located in a housing which has a particular construction according to the present invention. This housing has a fixed portion composed of the bottom wall 38, the side wall 39, and the front end wall 40 shown in FIG. 1. These three walls 38–40 of the housing are fixed permanently with the printer housing 2, and a tubular housing portion 44 (FIG. 5) serves to connect the housing portion 38–40 permanently with the main printer housing 2. This housing for the light-measuring means also includes the walls 41–43 indicated in FIG. 2, and the portion of the housing formed by the walls 41–43 is removably connected to the printer so as to be removable from the walls 38–40. Thus, the removable portion of the housing of the light-measuring means includes the rear housing wall 42, the top wall 43, and the side wall 41 which is located opposite the side wall 39 when the removable housing portion is connected with the fixed housing portion.

This fixed housing portion has connected to its side wall 39 a bracket 45 having extensions which extend away from the wall 39 and which respectively carry the plates 29–31 and the interference filters 27 and 28, as indicated in FIG. 1. The bracket 45 is removably connected with the wall 39 as by being screwed thereto, for example. The wall 40 of the housing portion 38–40 fixedly carries a bracket 46 (FIG. 1), and this bracket 46 carries a multiple socket member 47 which has a plurality of electrical contacts connected through the cable 48 electrically with the electronic control devices 71, 72, 73 of the housing 37.

The removal housing portion 41–43 is capable of being connected with the fixed housing portion 38–40 by screw members, for example, and the wall 41 of the removable housing portion carries the sockets which receive the photocells 24–26. Thus, FIG. 2 indicates the sockets 49–51 which respectively receive the photocells 24–26. In addition, the wall 41 carries the multiple plug member 52 which carries a plurality of prongs respectively received in the sockets of the multiple socket member 47, and through the electrical cables 53–55 the several photocells 24–26 are respectively connected to the multiple prong member 52 so that when the latter is received in the multiple socket member 47 the several photocells will be connected electrically through the cable 48 to the electronic control devices 71, 72, 73 of the housing 37.

When joining the housing portion 41–43 to the housing portion 38–40, the side wall 41 is maintained parallel to and at the elevation of the side wall 39 and moved toward the latter with the top wall 43 located over the bottom wall 38 and the end wall 42 located opposite the end wall 40. During this movement of the removable housing portion 41–43 toward the stationary housing portion 38–40, the prongs of the multiple plug 52 will enter into the sockets of the multiple socket member 47, and also the photocells 24–26 will move to their positions indicated in FIG. 3 with respect to the light-diffusing plates 29–31, respectively, so that when the removable housing portion 41–43 is fixed to the permanent housing portion 38–40 all of the components of the light-measuring means will be properly positioned with respect to each other and the light-measuring means will be ready for operation, and also the entire llight-measuring means will be enclosed within the housing formed by the portion 38–40 and 41–43.

As a result of this construction it is a simple matter at any time to remove the removable housing portion 41–43 so that the photocells 24–26 are easily accessible and can be very conveniently exchanged, as desired, and also the plates 29–31 as well as the filters 27 and 28 become freely accessible so that they can be very easily and quickly cleaned if required.

It will be understood that each of the elements described above, or two or more together, may also find a useful application in other types of photographic printers differing from the types described above. For instance, the production of an image of the exit pupil of the objective 22 on or near the measuring means may be useful not only in color printers, but also in printers for making black and white prints. Said last mentioned printers may be provided with one photoelectric cell only.

While the invention has been illustrated and described as embodied in photographic color printers, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a photographic printer, in combination, a light source; objective means for projecting light from said source to a light-sensitive paper for exposing the latter and producing a print thereon; measuring means for measuring the light directed by said objective means to the paper; and means between said measuring means and objective means for projecting to said measuring means an image of the exit pupil of said objective means.

2. In a photographic printer, in combination, a light source; support means for supporting a light-sensitive paper on which a print is to be made; objective means between said light source and support means for directing light from said light source to said support means to expose paper at said support means; second support means between said light source and objective means for supporting a negative which is to be reproduced on the paper, the light from said light source passing through the negative to the objective means to be directed thereby to the paper; measuring means for measuring the light directed by said objective means to said paper; and field lens means between said objective means and measuring means for directing an image of the exit pupil of said objective means to said measuring means, said field lens means having directed toward said objective means a surface which is located in the image plane of said objective means with respect to the distance of the negative from said objective means.

3. In a photographic printer, in combination, a light source; support means for supporting a light-sensitive paper on which a print is to be made; objective means between said light source and support means for directing light from said light source to said support means to expose paper at said support means; second support means between said light source and objective means for supporting a negative which is to be reproduced on the paper, the light from said light source passing through the negative to the objective means to be directed thereby to the paper; measuring means for measuring the light directed by said objective means to said paper; field lens means between said objective means and measuring means for directing an image of the exit pupil of said objective means to said measuring means, said field lens means having directed toward said objective means a surface which is located in the image plane of said objective means with respect to the distance of the negative from said objective means; and masking means locating in said image plane and cooperating with said field lens means for masking the image produced on said surface thereof so that said image will have only a selected portion of the negative.

4. In a photographic printer, in combination, a light source; first support means located in the path of light rays issuing from said light source for supporting a negative through which light from said light source passes; second support means located in the path of light rays which pass through said negative for supporting a light-sensitive paper on which a reproduction of the negative is to be reproduced; objective means between said first and second support means for directing the light which passes through said negative to the paper; photocell means for measuring the light directed from said objective means to the paper; and optical means between said objective means and photocell means for projecting an image of the exit pupil of said objective means on to said photocell means.

5. In a photographic printer, in combination, a light source; first support means located in the path of light rays issuing from said light source for supporting a negative through which light from said light source passes; second support means located in the path of light rays which pass through said negative for supporting a light-sensitive paper on which a reproduction of the negative is to be reproduced; objective means between said first and second support means for directing the light which passes through said negative to the paper; photocell means for measuring the light directed from said objective means to the paper; and optical means between said objective means and photocell means for projecting an image of the exit pupil of said objective means on to said photocell means, said photocell means including a photocell and a light-diffusing plate located adjacent to said photocell between the latter and said optical means, said optical means projecting said exit pupil image on to said plate.

6. In a photographic printer, in combination, a light source; first support means located in the path of light rays issuing from said light source for supporting a negative through which light from said light source passes; second support means located in the path of light rays which pass through said negative for supporting a light-sensitive paper on which a reproduction of the negative is to be reproduced; objective means between said first and second support means for directing the light which passes through said negative to the paper; photocell means for measuring the light directed from said objective means to the paper; and optical means between said objective means and photocell means for projecting an image of the exit pupil of said objective means on to said photocell means, said photocell means including a photocell and a light-diffusing plate located adjacent to said photocell between the latter and said optical means, said optical means projecting said exit pupil image on to said plate, and said optical means having directed toward said objective means a surface located in the image plane of said objective means with respect to the distance between the negative and said objective means so that a sharp image of the negative is produced on said surface of said optical means.

7. In a photographic printer, in combination, a light source; first support means for supporting a light-sensitive printing material on which a print is to be made; objective means between said light source and first support means for directing light from said light source to said first supporting means to expose printing material at said first support means, said printing material being located in a first image plane of said objective means, second support means between said light source and objective means for supporting a transparency which is to be reproduced on said printing material, the light from said light source passing through the transparency to the objective means to be directed thereby to the printing material; reflecting means between said objective means and said first support means for reflecting light coming from said objective means and falling onto said reflecting means; measuring means arranged in the path of light reflected by said reflecting means for measuring said reflected light; lens means between said reflecting means and measuring means for directing an image of the exit pupil of said objective means to said measuring means; and masking means also located between said reflecting means and measuring means in the region of a second image plane of the objective means with respect to the transparency supported by said second support means for masking the image produced on said second image plane so that light rays only of a selected portion of the transparency supported by said second support means will reach said measuring means.

References Cited in the file of this patent

UNITED STATES PATENTS

| | | |
|---|---|---|
| 2,402,660 | O'Grady | June 25, 1946 |
| 2,553,285 | Thomas | May 15, 1951 |
| 2,556,431 | Mihalyi | June 12, 1951 |
| 2,691,917 | Curry | Oct. 19, 1954 |
| 2,771,594 | Gourdou | Nov. 20, 1956 |
| 2,792,740 | Haynes | May 21, 1957 |
| 2,909,097 | Alden et al. | Oct. 20, 1959 |
| 2,952,184 | Bakke et al. | Sept. 13, 1960 |
| 2,981,791 | Dixon | Apr. 25, 1961 |
| 3,035,179 | Parker | May 15, 1962 |
| 3,049,967 | Duerr | Aug. 21, 1962 |

FOREIGN PATENTS

| | | |
|---|---|---|
| 515,932 | Great Britain | Dec. 19, 1939 |

OTHER REFERENCES

McFee: Optica Acta, vol 7, No. 1, January 1960, pages 42–43 relied upon.